No. 796,144. PATENTED AUG. 1, 1905.
W. B. NORTON.
PISTON PACKING.
APPLICATION FILED NOV. 21, 1904.
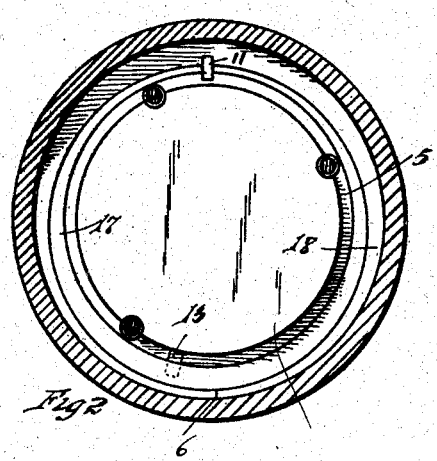
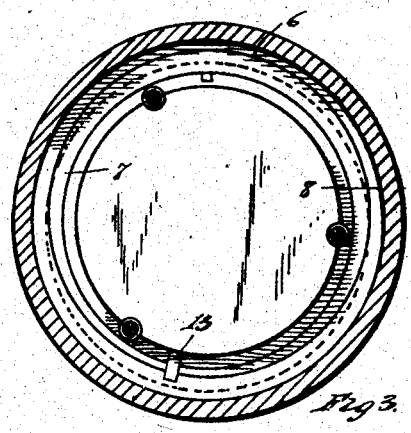
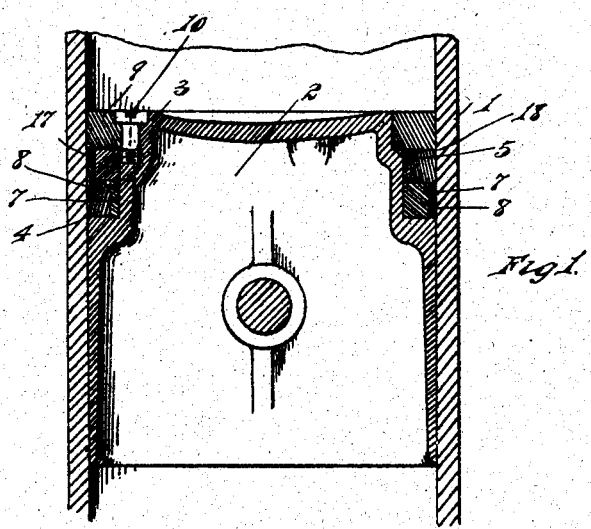
WITNESSES
INVENTOR
William B Norton
By
Parker & Burton Attorneys.

UNITED STATES PATENT OFFICE.

WILLIAM B. NORTON, OF DETROIT, MICHIGAN.

PISTON-PACKING.

No. 796,144.            Specification of Letters Patent.          Patented Aug. 1, 1905.

Application filed November 21, 1904. Serial No. 233,615.

*To all whom it may concern:*

Be it known that I, WILLIAM B. NORTON, a citizen of the United States, residing at Detroit, county of Wayne, State of Michigan, have invented a certain new and useful Improvement in Piston-Packings; and I declare the following to be a full, clear, and exact description of the invention, such as will enable others skilled in the art to which it pertains to make and use the same, reference being had to the accompanying drawings, which form a part of this specification.

This invention relates to piston-packing. It has for its object an improved metallic packing intended to be used to produce a tight joint between the piston-head and the walls of the cylinder. The packing consists of elastic rings, which engage so closely against the walls of the cylinder and against the parts which confine them to the piston-head and so closely with one another that neither steam, air, nor the compressed gases of explosive-engines are able to escape from the piston-chamber to the outside thereof or from one chamber of the piston to another chamber of the piston.

In the drawings, Figure 1 is a sectional view showing the cylinder-walls, the piston-head, and the packing-rings. Fig. 2 is a plan view showing the head of the piston and showing the cylinder in section. In this view the two lower packing-rings are shown. Fig. 3 is a similar section showing the two packing-rings which are near the end of the piston-rod and indicating by dotted lines the two rings which are shown in Fig. 2.

1 indicates the cylinder.

2 indicates the piston-stem.

3 indicates the piston-head, which is provided with a seat 4 for packing-rings and with a second seat 5 of smaller internal diameter for a junk-ring. On the seat 4 are placed two packing-rings of the kind known as "eccentric" packing-rings—that is, they are flat rings having the inner boundary-line, so that each ring has a broader flat face at one part, and from this broad part the breadth across the face of the ring gradually diminishes until at a point opposite the broad part the ring has the narrowest part of its face. The ring has a uniform thickness between its faces. The ring is cut through or split at the narrow part 6. The diameter of the inner boundary of one of the rings is approximately equal to the diameter of the outer boundary of the second ring, and one ring may be placed within the other with the wide part of the one engaging in close proximity to the narrow part of the second. When thus assembled, they together form a compound ring whose inner and outer peripheries are substantially concentric, but which as a whole is capable of slight expansion and contraction, because each ring is split. A pair of these rings 7 and 8 are placed on the seat 4, and a second pair of exactly similar rings are placed above the first pair, with the thin part of each upper ring lying above the wide part of the corresponding lower ring. Thus all the joints of the rings are arranged to cross each other, and in no place is one joint made as a continuation of the joint of another part. Above the upper pair of rings nearest the end of the piston-rod is placed an ordinary junk-ring 9, which is held to the piston-head by screws 10, inserted in proper screw-holes. The threaded end of the screw engages in a tapped hole in the seat for the junk-ring. The stem part may pass through a perforation in the junk-ring or (as I prefer) may engage in holes that are half in the junk-ring and half in the piston.

All the flat surfaces of both seats, rings, and junk-ring are preferably ground surfaces.

The rings are made of some resilient material, generally of cast-iron, which possesses sufficient resiliency and retains its elasticity under quite high temperature.

Between the ends of the ring which lies on the seat 4 and diametrically on the outside is placed a key or pin 11, which is fast in the body of the piston-head and engages between the ends of the innermost ring and engages in a shallow notch 13 in the outermost ring. The key prevents the rings from moving from the position in which they are originally placed. The upper set of packing-rings 17 and 18 are held in a similar manner, the lower rings passing over pin for upper rings and then turned to pass over the lower pin.

What I claim is—

1. A piston-packing, having in combination a pair of eccentric rings of different diameters and the smaller located inside the larger, a second pair of similarly-arranged rings superimposed upon the first with the thin part of each immediately above the thick portion of the corresponding ring of the lower pair and a junk-ring adapted to hold the assembled rings in position, substantially as described.

2. In a piston-packing, the combination of split eccentric rings arranged in pairs, the members of each pair having different diameters, and in each pair the ring of smaller diameter being arranged within the ring of larger diameter and with its split portion directly above the wide portion of the corresponding ring of the next lower pair, means for holding the rings in position, and a junk-ring adapted to hold the assembled packing-rings to their seat, substantially as described.

3. In a piston-packing, the combination of a plurality of pairs of eccentric rings each split at its thinnest portion, the smaller ring of each pair fitting within the larger thereof and the split portion of each ring being placed over the wide part of the corresponding ring in the pair immediately below, substantially as described.

In testimony whereof I sign this specification in the presence of two witnesses.

WILLIAM B. NORTON.

Witnesses:
MAY E. KOTT,
CHARLES F. BURTON.